United States Patent
Benthien et al.

(10) Patent No.: US 9,428,258 B2
(45) Date of Patent: Aug. 30, 2016

(54) HOLDING DEVICE FOR INTERIOR LINING PARTS OF A FUSELAGE

(71) Applicant: AIRBUS OPERATIONS GMBH, Hamburg (DE)

(72) Inventors: Hermann Benthien, Sottrum (DE); Ali Güngör, Bremen (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 13/860,261

(22) Filed: Apr. 10, 2013

(65) Prior Publication Data

US 2013/0228667 A1 Sep. 5, 2013

Related U.S. Application Data

(63) Continuation of application No. PCT/EP2011/005089, filed on Oct. 11, 2011.

(60) Provisional application No. 61/392,066, filed on Oct. 12, 2010.

(30) Foreign Application Priority Data

Oct. 12, 2010 (DE) .......... 10 2010 048 243

(51) Int. Cl.
*B64C 1/06* (2006.01)
*E04B 9/22* (2006.01)
(Continued)

(52) U.S. Cl.
CPC ............ *B64C 1/066* (2013.01); *B32B 3/06* (2013.01); *B60R 21/214* (2013.01); *B64C 1/403* (2013.01);
(Continued)

(58) Field of Classification Search
CPC .................................................. B64C 1/066
USPC ............ 248/327, 328, 231.91, 343, 344, 544, 248/548, 900, 909; 52/39, 506; 244/131, 244/119, 120, 118.2, 118.5, 121; 403/167, 403/168; 411/395, 401, 380, 381, 537, 216, 411/217, 221
See application file for complete search history.

(56) References Cited

U.S. PATENT DOCUMENTS 2,126,030 A * 8/1938 Peterson ................ 343/812
2,376,279 A * 5/1945 Schlenkert ............. 52/509
(Continued)

FOREIGN PATENT DOCUMENTS

DE 196 10 138 9/1997
DE 10 2009 006 578 8/2010

OTHER PUBLICATIONS

International Search Report dated Jul. 2, 2012.

*Primary Examiner* — Joshua J Michener
*Assistant Examiner* — Chiedu Chibogu
(74) *Attorney, Agent, or Firm* — Dickinson Wright PLLC

(57) ABSTRACT

A holding device for in particular panel-shaped interior lining parts of a fuselage, has a configuration that is easy and simple to mount, each holding device includes a supporting device, which is used to anchor the holding device on a primary structure of the fuselage and comprises a joint; a connecting tube, which extends out of the supporting device and one end of which is attached to the joint; a mounting for an interior lining part, to which mounting the other, opposite end of the connecting tube to the one end is attached; and a lanyard, which is fastened to the supporting device is and the mounting and extends through the connecting tube and the length of which is greater than the length of the connecting tube.

14 Claims, 3 Drawing Sheets

Figure 1:
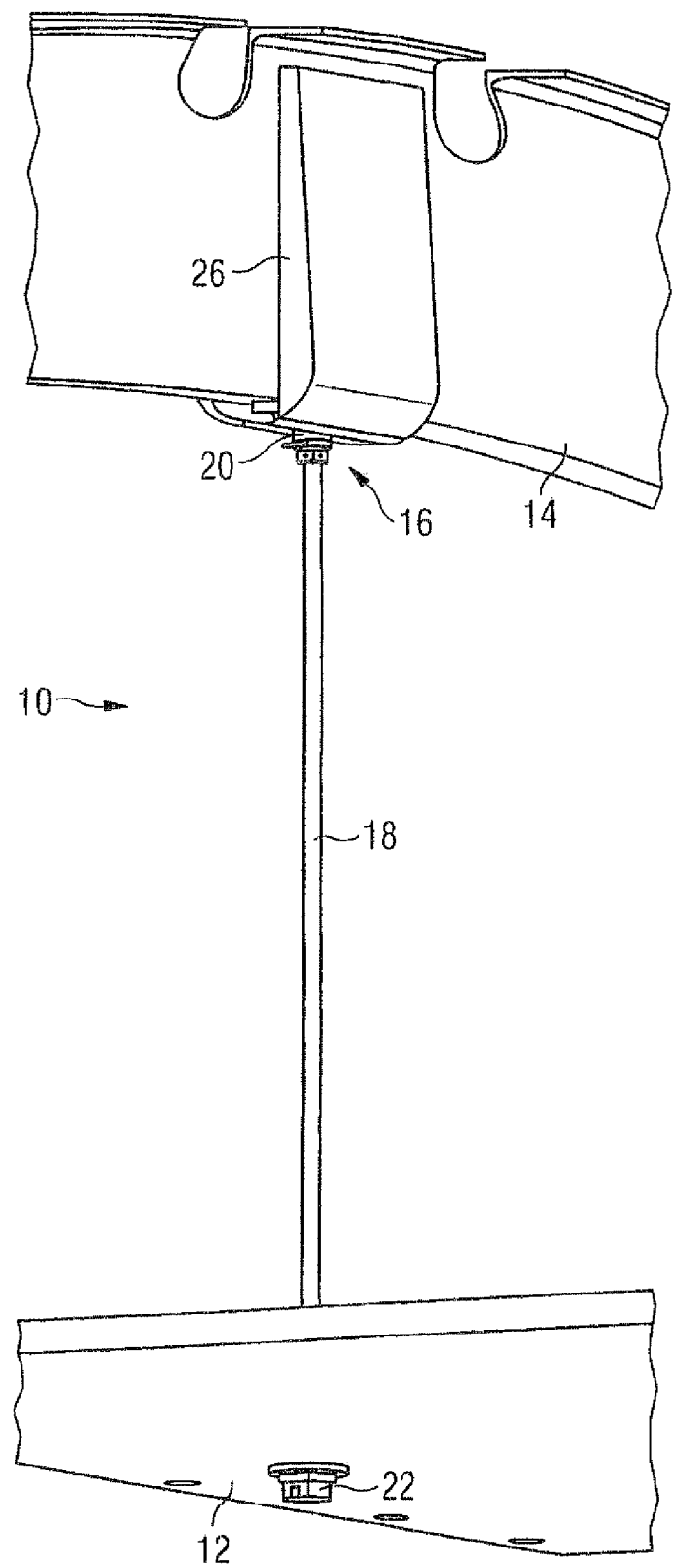

(51) Int. Cl.
    *E04B 9/24*     (2006.01)
    *B64C 1/40*     (2006.01)
    *B32B 3/06*     (2006.01)
    *E04H 9/02*     (2006.01)
    *E04H 9/06*     (2006.01)
    *B60R 21/214*     (2011.01)
    *B60R 21/04*     (2006.01)
    *B29L 31/30*     (2006.01)
    *B64D 11/00*     (2006.01)

(52) U.S. Cl.
CPC ............... *B64C 1/406* (2013.01); *E04B 9/225* (2013.01); *E04B 9/242* (2013.01); *E04H 9/02* (2013.01); *E04H 9/027* (2013.01); *E04H 9/029* (2013.01); *E04H 9/06* (2013.01); *B29L 2031/3011* (2013.01); *B29L 2031/3041* (2013.01); *B32B 2419/06* (2013.01); *B60R 2021/0442* (2013.01); *B64D 2011/0046* (2013.01); *Y02T 50/46* (2013.01)

(56) References Cited

U.S. PATENT DOCUMENTS

| | | | | |
|---|---|---|---|---|
| 2,762,598 | A * | 9/1956 | Runge | 248/327 |
| 2,916,309 | A * | 12/1959 | Wolar | 285/86 |
| 3,426,489 | A * | 2/1969 | Lambert | 52/39 |
| 3,512,743 | A * | 5/1970 | Lipscomb | 248/324 |
| 3,551,012 | A * | 12/1970 | Downen et al. | 403/11 |
| 3,838,661 | A * | 10/1974 | Medley, Jr. | 116/63 P |
| 3,842,561 | A * | 10/1974 | Wong | 52/506.07 |
| 3,859,770 | A | 1/1975 | Chambers | |
| 4,084,364 | A * | 4/1978 | Jones | 52/506.07 |
| 4,114,250 | A * | 9/1978 | Dent | 29/517 |
| 4,686,570 | A | 8/1987 | Lewis, Jr. | |
| 4,720,204 | A * | 1/1988 | Johnson | 403/24 |
| 4,760,495 | A * | 7/1988 | Till | 361/804 |
| 4,850,565 | A * | 7/1989 | Moreno | 248/545 |
| 4,926,607 | A * | 5/1990 | Platt et al. | 52/506.07 |
| 5,080,313 | A * | 1/1992 | Byrum et al. | 248/343 |
| 5,095,673 | A | 3/1992 | Ward | |
| 5,873,644 | A | 2/1999 | Roessner | |
| 6,360,507 | B1 * | 3/2002 | Nevers et al. | 52/506.07 |
| 7,228,669 | B1 * | 6/2007 | Yaraschefski | 52/506.06 |
| 7,455,263 | B2 * | 11/2008 | Lau et al. | 244/118.5 |
| 7,665,708 | B2 * | 2/2010 | Stothers | B64C 1/066 248/638 |
| 8,151,821 | B2 * | 4/2012 | Ball | 137/359 |
| 8,281,800 | B2 * | 10/2012 | Ball et al. | 137/359 |
| 2002/0153033 | A1 * | 10/2002 | Miller | 135/121 |
| 2003/0019999 | A1 * | 1/2003 | Hill et al. | 248/548 |
| 2004/0005218 | A1 * | 1/2004 | Marshall | 416/146 R |
| 2004/0172032 | A1 * | 9/2004 | Jackson | 606/73 |
| 2009/0224103 | A1 | 9/2009 | Neumann | |
| 2010/0054856 | A1 * | 3/2010 | Schalla | F16C 7/02 403/408.1 |
| 2010/0096506 | A1 * | 4/2010 | Benthien | F16C 7/026 244/131 |
| 2010/0187362 | A1 | 7/2010 | Henny | |
| 2012/0145419 | A1 * | 6/2012 | Uchiyama | 169/51 |

\* cited by examiner

ZERO POSITION — A

HOLDING DEVICE FOR INTERIOR LINING PARTS OF A FUSELAGE

CROSS REFERENCE TO RELATED APPLICATIONS

This application is a bypass continuation of PCT/EP2011/005089 filed Oct. 11, 2011 which is entitled to and claims the benefit of German Application No. DE 10 2010 048 243.9 filed Oct. 12, 2010 and U.S. Provisional Application No. 61/392,066, filed Oct. 12, 2010, the disclosures of each of which, including the specification, claims, drawings and abstract, are incorporated herein by reference in their entirety.

FIELD

The present invention relates to a holding device for interior lining parts of a fuselage and to a supporting system for interior lining parts employing such holding devices. The interior lining parts are in particular panel-shaped interior lining parts that may be flat or curved. Interior lining parts of the described type, which are also referred to as linings, may be for example ceiling lining parts or side lining parts in the cabin of an aircraft.

BACKGROUND

Such linings fulfill various functions. Firstly, they protect systems situated behind the lining from loads that are exerted in the aircraft cabin on the linings. These loads may be caused for example by passengers but also by vehicles, by means of which articles that are to be transported are brought into the fuselage. In this connection, one of the approval requirements of an aircraft is that system-related damage to systems situated behind the linings has to be either prevented or perceptible. If for example a passenger inadvertently leans against an interior lining part, it has to be guaranteed that a system situated behind the interior lining part is not damaged by this or that the interior lining part by means of visible damage indicates that something is wrong.

The interior lining parts fulfill a further function in the event of an explosive loss of internal pressure (so-called rapid decompression). In such a situation an interior lining part should not fall down in an uncontrolled manner and hence possibly injure passengers and/or block escape routes.

Finally, it has to be ensured that loads acting upon the interior lining parts do not have a negative influence on the primary structure of the fuselage.

A known solution for meeting the objectives described above consists of providing a supporting framework, the so-called lining back-up structure, which consists of large frame elements that are assembled and mounted in the aircraft. The interior lining parts are fastened removably to the frame elements. The frame elements in turn are connected to the primary structure of the fuselage by means of rods at attachment points that are reduced to a minimum in order to achieve as complete as possible a mechanical uncoupling of the frame elements from the primary structure, In this case, the rods are designed in such a way that under the effect of an excessive load they fail before the frames in order to rule out damage to the primary structure. The described solution is not only relatively heavy but it is also very difficult to guarantee that the rods fail not only sooner than the frames but also sooner than the interior lining parts.

SUMMARY

The underlying object of the invention is to provide a holding device and a supporting system employing such holding devices for interior lining parts of a fuselage that overcome the previously described problems.

This object is achieved according to the invention by a holding device for in particular panel-shaped interior lining parts of a fuselage, wherein the holding device comprises a supporting device with a joint, which is used to anchor the holding device on a primary structure of the fuselage, a connecting tube, which extends out of the supporting device and one end of which is attached to the joint, a mounting for an interior lining part, to which the other, opposite end of the connecting tube to the one end is attached, and an arrester cable or lanyard, which is fastened to the supporting device and the mounting and extends through the connecting tube and the length of which is greater than the length of the connecting tube.

Such a holding device has a number of advantages: the supporting device, a base of which is preferably screw-connected, riveted or glued to the primary structure in the sense of a good fastening, ensures by means of its joint that a force exerted on an interior lining part cannot lead to a moment acting upon the primary structure (moment force-free attachment). The connecting tube by virtue of suitable dimensioning of its load-bearing cross section in a simple manner offers the possibility of allowing the connecting tube, in the event of a load exceeding a defined amount, to fail before the supporting device and the mounting and in particular before the interior lining part attached to the holding device. The connecting tube moreover offers excellent protection for the lanyard that extends through it. As a result of eliminating the frame elements mentioned in connection with the background art, the interior lining part mounting attached to the other end of the connecting tube is many times lighter and yet guarantees a secure attachment of the interior lining part. The lanyard fastened to the supporting device and the mounting ensures that, in the event of a sudden pressure drop in the fuselage and/or aircraft cabin that leads to a planned breaking of the connecting tube, the interior lining part cannot fly in an uncontrolled manner through the surrounding area but is held at a distance from the supporting device that is defined by the length of the lanyard. Because of the lanyard being greater in length than the connecting tube, in the event of breaking of the connecting tube, at the side edges of the interior lining part slots is open in relation to adjoining interior lining parts, through which slots a suddenly occurring pressure difference may be reduced without detrimental forces being transmitted from the interior lining parts to the primary structure. As a result of their, on the whole, lightweight design, many attachment points instead of just a few may be used without a weight disadvantage to attach the interior lining parts, which are each of an identical construction and arranged preferably in a grid, which may have for example a square grid dimension. Thus, under the effect of a local load upon one interior lining part, associated holding devices may fail in a defined manner without this having a detrimental effect upon the remaining supporting structure.

As already mentioned, in the holding device according to the invention the load-bearing cross section of the connecting tube is preferably dimensioned in such a Way that, in the event of a load that exceeds a defined amount, the connecting tube fails before the supporting device and before the mounting. In particular, the load-bearing cross section of the connecting tube in this case is dimensioned in such a way that the connecting tube fails not only before the supporting device and the mounting but primarily before the interior lining part supported by means of the holding device. A load exceeding a defined amount and acting upon the interior lining part therefore leads, because of the breaking of the connecting tube, to a separation of this interior lining part from the group of other interior lining parts (with the result that the occurrence of the excessive load becomes perceptible) without damaging the interior lining part itself.

In preferred embodiments of the holding device according to the invention, the joint of the supporting device restricts a swiveling of the connecting tube relative to the supporting device to a predetermined swiveling range that is preferably ca. 30° or less and is preferably centered in relation to a zero position. Here, the position of the s connecting tube, in which the connecting tube extends precisely at right angles out of the supporting device, is described as the zero position. By virtue of the restriction of the swiveling range of the connecting tube, the subsequent mounting of the interior lining part or parts is facilitated because the free end of the connecting tube with the mounting attached thereto for receiving an interior lining part is always situated close to an associated through-opening of an interior lining part that is to be supported, the through-opening being used to attach the interior lining part to the mounting. Particularly when an interior lining part is to be supported by a plurality of holding devices according to the invention, the restriction of the swiveling range of the connecting tube to only a few degrees during mounting is very advantageous.

According to a preferred development of the holding device according to the invention, the supporting device comprises a clamping surface and a clamping element cooperating therewith, which are both disposed concentrically with the connecting tube. The annular clamping surface and the annular clamping element are used to clamp between them the edge of an opening of an insulating material layer that serves as primary insulation of the inner region of the fuselage. The opening in the insulating material layer is needed to allow the holding device, which is supported directly on the primary structure of the fuselage, to extend into the interior of the fuselage. By virtue of clamping in the edge of this through-opening by means of clamping surface and clamping element simple and efficient sealing in an inward direction is achieved, which prevents the occurrence of condensation and corrosion. The clamping element may for example be pressed against the clamping surface by means of a clamping screw that is mounted on the connecting tube. Preferably the clamping element is accommodated in a twistproof manner on the connecting tube in order during tightening to prevent damage to the insulating material as a result of simultaneous turning of the clamping element.

The mounting on the other end of the connecting tube preferably comprises an adjusting sleeve, which is connected to the other end of the connecting tube, as well as a clamping sleeve, which is connected to the adjusting sleeve. By means of the adjusting sleeve, which may for example be screwed onto an external thread on the other end of the connecting tube, the desired clearance between the supporting device and the mounting for receiving the interior lining part may be precisely adjusted. The clamping sleeve, which may for example be screwingly connected to the adjusting sleeve, is then used to clamp an interior lining part against the adjusting sleeve.

The adjusting sleeve and the clamping sleeve preferably each have a holding flange, against which the interior lining part to be received may come to lie and between which the interior lining part is held in the mounted state.

In preferred embodiments, to fasten the lanyard a retaining body is used, which is fastened to each end of the lanyard and the external diameter of which is greater than the inside diameter of the connecting tube. The retaining body may for example be cylindrical and have a through-bore, through which the associated end of the lanyard may be inserted and then secured by means of a knot. Instead of a knot, a kind of seal or the like may be pressed onto the end of the lanyard to prevent the lanyard end from slipping through the retaining body. Alternatively, the retaining body itself may be connected to the lanyard end by compression in such a way that the lanyard end is reliably secured in the retaining body. The retaining body itself, because its external dimension exceeds the inside diameter of the connecting tube, ensures that the lanyard cannot slip through the connecting tube and, in the event of breaking of the connecting tube, is held reliably on the two ends of the connecting tube.

DETAILED DESCRIPTION OF THE DRAWINGS

Figure 2:
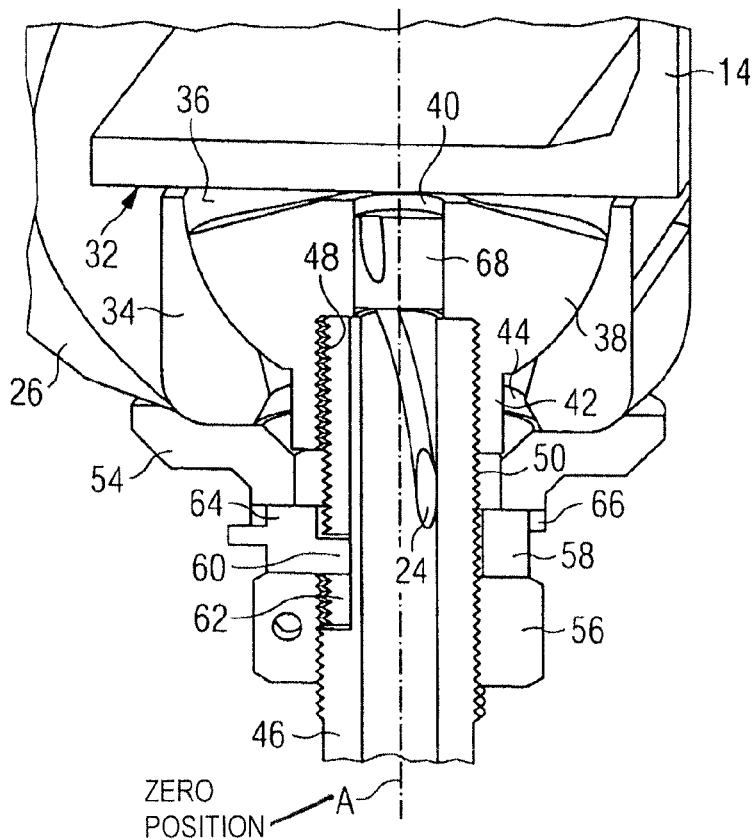
Figure 3:
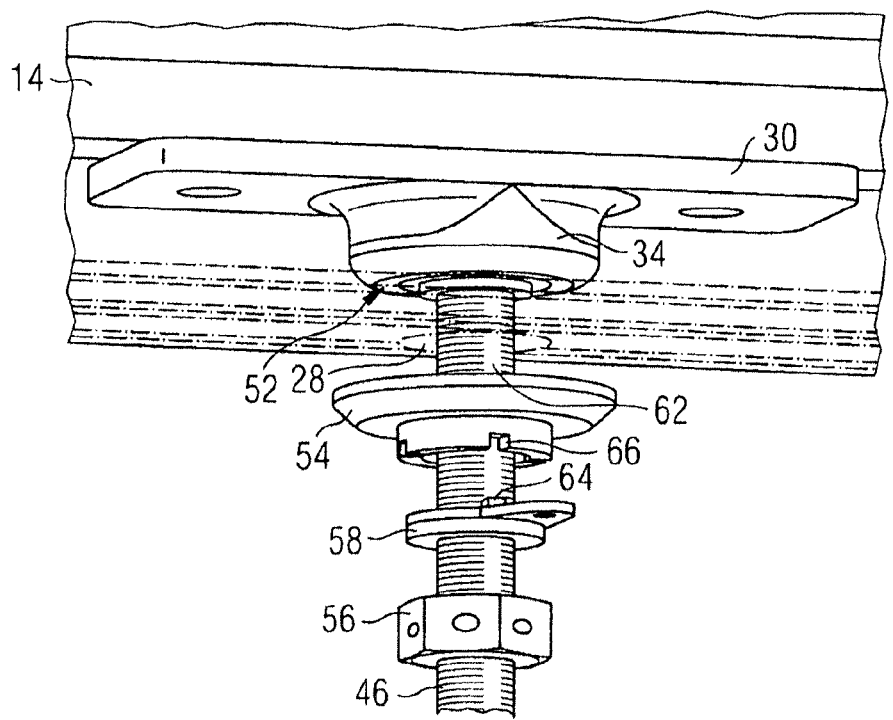
Figure 4:
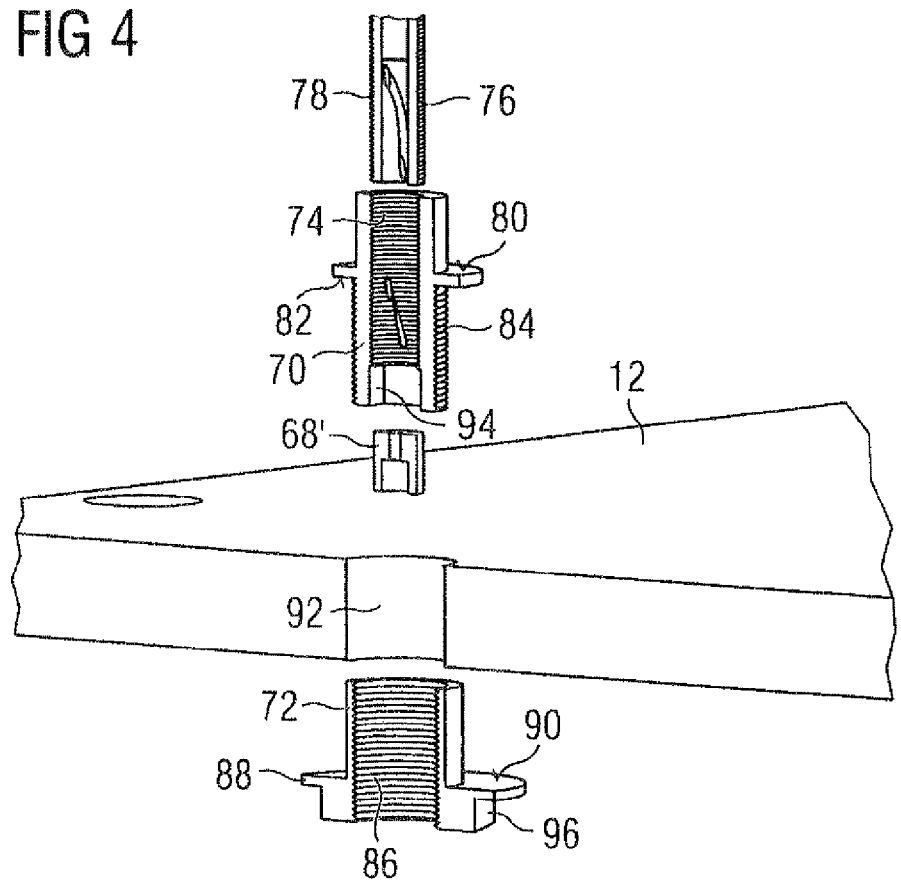
Figure 5:
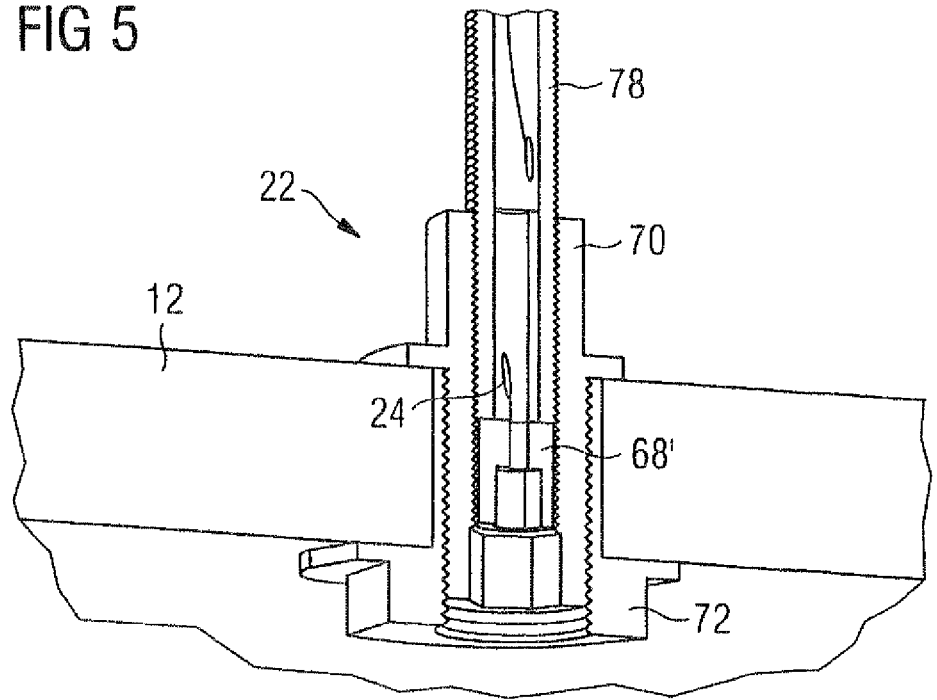

There now follows a detailed description of a currently preferred embodiment of a holding device according to the invention with reference to the accompanying, diagrammatic figures. These show:

FIG. 1 a three-dimensional representation of an embodiment of a holding device according to the invention in the mounted state, FIG. 2 a three-dimensional, longitudinally sectioned view of a supporting device of the holding device of FIG. 1, FIG. 3 a three-dimensional representation of the supporting device of FIG. 2 in the exploded state, FIG. 4 a mounting of the holding device of FIG. 1 in a three-dimensional and longitudinally sectioned exploded view, and FIG. 5 the mounting of FIG. 4 in the assembled state.

DETAILED DESCRIPTION OF EMBODIMENTS

FIG. 1 shows a holding device generally denoted by 10 for an in particular panel-shaped interior lining part 12 of a fuselage, of which only a small part of a frame 14 forming part of the primary structure of the fuselage is shown here.

The holding device 10 represented in a mounted state in FIG. 1 comprises a supporting device 16, by means of which the holding device is supported on the primary structure of the fuselage, here on the frame 14, as well as a connecting tube 18, which extends out of the supporting device 16 and one end of which is attached to a joint 20 of the supporting device, as well as a mounting 22 for the interior lining part 12, to which mounting the other, opposite end of the connecting tube 18 to the one end is attached, and finally a lanyard 24 (see FIG. 2), which is fastened to the supporting device 16 and the mounting 22 and extends through the connecting tube 18 and which is longer than the connecting tube 18.

The frame 14 at its side facing the interior of the fuselage is surrounded by a layer of insulating material 26, which forms part of the primary insulation of the fuselage and of which only a small portion in the region of the supporting device 16 is reproduced in FIG. 1. The insulating material 26 at each point associated with a holding device 10 is provided with a, here circular, through-opening 28 (see FIG. 3) to allow the connecting tube 18 to pass through.

The construction of the supporting device 16 is now described more precisely with reference in particular to FIGS. 2 and 3. The supporting device 16 has a, here, on the whole plate-shaped base 30, which is connected in a fixed manner to a seating surface 32 of the frame 14 by fastening means, for example screws or rivets, that are not represented here. Alternatively, the base 30 may be glued onto the seating surface 32. Formed internally in a portion 34 of the base 30 extending away from the seating surface 32 is a concave, substantially hemispherical surface 36, in which a likewise substantially hemispherical joint body 38 of a complementary shape is supported. The surface 36 and the joint body 38 together form the already mentioned joint 20 of the supporting device 16.

Extending through the center of the joint body 38 is a stepped through-bore 40, which at the part of the joint body 38 remote from the frame 14 is lengthened in its larger-diameter part by a tubular stub 42, which projects concentrically with a center line A of the joint body 38 from the convex, hemispherical surface thereof. The stub 42 projects through a recess 44, which is concentric with the center line A, in the portion 34 of the base 30. The radial clearance between the outside of the stub 42 and the edge of the recess 44 restricts the swiveling range of the joint 20 to a predetermined amount, which is at most ca. 30° or less and is centered in relation to the center line A, which in FIG. 2 symbolizes the zero position.

For fastening the one end 46 of the connecting tube 18 the larger-diameter part of the through-bore 40 (including the inside of the stub 42) is provided with an internal thread 48, into which an external thread 50 formed on the end 46 is screwed. The portion 34 of the base 30 at its side remote from the frame 14 has an annular clamping surface 52 formed thereon, which interacts with a surface of a substantially complementary shape of an annular clamping element 54 that may be braced by means of a clamping nut 56, which is in engagement with the external thread 50, axially against the clamping surface 52 in order sealingly to fix the edge of a through-opening 28 of the insulating material 26 between the clamping surface 52 and the opposing clamping surface of the clamping element 54. In order during tightening of the clamping nut 56 to prevent a simultaneous turning of the clamping element 54 and hence possible damage of the insulating material 26, on the connecting tube 18 between the clamping element 54 and the clamping nut 56 an annular anti-rotation element 58 is disposed, which engages with one (or more) radially inwardly projecting extension 60 into a longitudinal cut 62 formed on the end portion 46 and with a plurality of axial projections 64 arranged distributed over the periphery into corresponding recesses 66 in the damping element 54 (see also FIG. 3).

Accommodated in the smaller-diameter part of the through-bore 40 of the joint body 38 is a, here, circular-cylindrical retaining body 68, in which one end of the lanyard 24 is securely fastened, for example by compression. The outside diameter of the retaining body 68 is greater than the inside diameter of the connecting tube 18, so that the retaining body rests on the one end 46 of the connecting tube 18 and cannot slip through the connecting tube.

There now follows a more precise description of the mounting 22 with reference to FIGS. 4 and 5. The mounting 22 substantially consists of an adjusting sleeve 70 and a clamping sleeve 72. The adjusting sleeve 70 has an internal thread 74, with which it is screwed onto an external thread 76 formed on an end portion of the other s end 78 of the connecting tube 18. By screwing the adjusting sleeve 70 in and out on the external thread 76 a desired or defined distance between the supporting device 16 and the interior lining part 12 that is to be supported may be precisely adjusted. For seating of the interior lining part 12 on the adjusting sleeve 70 a, here, annular holding flange 80 is used, which projects radially from the exterior of the adjusting sleeve 70 and provides a seating surface 82 for the interior lining part 12.

For connecting the adjusting sleeve 70 to the clamping sleeve 72 there is formed on the adjusting sleeve 70 on the far side of the holding flange 80—viewed from the direction of the supporting device 16—a further external thread 84, onto which an internal thread 86 of the clamping sleeve 72 may be screwed. The clamping sleeve 72 is also provided with a holding flange 88, which provides a seating surface 90 for the interior lining part 12. By driving the clamping sleeve 72 on the adjusting sleeve 70 the edge of a through-opening 92 in the interior lining part 12 comes to lie against the seating surfaces 82 and 90 of the adjusting sleeve 70 and the clamping sleeve 72 respectively, so that the interior lining part 12 is held securely between the seating surfaces 82 and 90.

In an analogous manner to the supporting device 16, the lanyard 24 is held in the mounting 22 by means of a further retaining body 68'. FIG. 5 shows the assembled state of the mounting 22.

For screwing the adjusting sleeve 70 onto the other end 78 of the connecting tube 18 the adjusting sleeve 70 is provided at its free end with a hexagon socket recess 94. The clamping sleeve 72 is provided at its free end with tool application surfaces 96 for a spanner or a hexagon spanner.

The load-bearing material cross section of the connecting tube 18 is designed in such a way that, if a defined maximum load is exceeded, the connecting tube 18 breaks and does so namely before the load-bearing capacity of the interior lining part 12 is exceeded. In the broken state of the connecting tube 18 the interior lining part 12 may, because the lanyard 24 is slightly longer than the connecting tube, move a little away from the supporting device 16 before being held back by the lanyard 24. The interior lining part 12 may therefore separate itself from a group of adjoining interior lining parts, thereby producing in the region of the side edges of the interior lining part 12 slots, which are clearly visible and hence indicate damage of the holding device 10 and which in the event of a sudden pressure loss increase the cross section of flow, by means of which the pressure difference may be reduced.

The invention claimed is:

1. A holding device for an interior lining part of a fuselage, the holding device comprising:
    a supporting device, which is configured to anchor the holding device on a structure of the fuselage and comprises a joint,
    a connecting tube, which extends out of the supporting device and has one end attached to the joint,
    a mounting for an interior lining part, wherein another end of the connecting tube is attached to said mounting, the another end being opposite to the one end, so that the mounted connecting tube defines a first distance between the supporting device and the mounting,
    a slacked lanyard fastened to the supporting device and the mounting and extending through the connecting tube, wherein the lanyard becomes straightened out and holds the supporting device and the mounting together in the event that the connecting tube breaks and separates, wherein the lanyard in its straightened out condition defines a second distance between the supporting device and the mounting, wherein the second distance is greater than the first distance, and
    wherein said one end of the connecting tube is directly attached to a hemispherical joint body of the joint, said another end of the connecting tube is directly attached to an adjusting sleeve of the mounting, one end of the lanyard is attached to said hemispherical joint body, and another end of the lanyard is attached to said adjusting sleeve, wherein the first distance and the second distance are between the hemispherical joint body and the adjusting sleeve.

2. The holding device according to claim 1,
    wherein a load-bearing cross section of the connecting tube is dimensioned in such a way that, in the event of a load that exceeds a defined amount, the connecting tube will break before the supporting device and the mounting break.

3. The holding device according to claim 1, wherein a load-bearing cross section of the connecting tube is dimensioned in such a way that, in the event of a load that exceeds a defined amount, the connecting tube is configured to break before the interior lining part breaks.

4. The holding device according to claim 1, wherein the joint restricts a swiveling of the connecting tube relative to the supporting device to a predetermined swiveling range.

5. The holding device according to claim 4, wherein the predetermined swiveling range is 30° or less.

6. The holding device according to claim 4, wherein the predetermined swiveling range is centered in relation to a zero position that is symbolized by a center line of the hemispherical joint body from a convex, hemispherical surface thereof.

7. The holding device according to claim 1, wherein the supporting device comprises a clamping surface and a clamping element interacting therewith, both of which are disposed concentrically with the connecting tube.

8. The holding device according to claim 1, wherein the mounting comprises a clamping sleeve, which is connected to the adjusting sleeve.

9. The holding device according to claim 8, wherein the adjusting sleeve and the clamping sleeve each have a holding flange configured to hold the interior lining part therebetween.

10. The holding device according to claim 8, wherein the another end of the connecting tube is provided with an external thread, onto which the adjusting sleeve is screwed, and the clamping sleeve is screwed onto the adjusting sleeve.

11. The holding device according to claim 1, wherein each end of the lanyard is fastened to a retaining body, the outside diameter of which is greater than the inside diameter of the connecting tube.

12. The holding device according to claim 1, wherein a base of the supporting device is configured to be riveted, glued or connected via screws to the structure.

13. The holding device according to claim 1, wherein the another end of the connecting tube is fixedly attached to the mounting.

14. The holding device according to claim 1, wherein the first distance is a fixed distance between the supporting device and the mounting.

* * * * *